No. 791,715. PATENTED JUNE 6, 1905.
I. N. NOYER.
DRAFT EQUALIZER.
APPLICATION FILED OCT. 28, 1904.

No. 791,715. Patented June 6, 1905.

UNITED STATES PATENT OFFICE.

ISAAC N. NOYER, OF POMEROY, WASHINGTON.

DRAFT-EQUALIZER.

SPECIFICATION forming part of Letters Patent No. 791,715, dated June 6, 1905.

Application filed October 28, 1904. Serial No. 230,341.

*To all whom it may concern:*

Be it known that I, ISAAC N. NOYER, a citizen of the United States, residing at Pomeroy, in the county of Garfield, State of Washington, have invented certain new and useful Improvements in Draft-Equalizers; and I do hereby declare the following to be a full, clear, and exact description of the invention, such as will enable others skilled in the art to which it appertains to make and use the same.

This invention relates to draft-equalizers; and it has for its object to provide a cheap and simple construction for equalizing the draft of a number of teams hitched in tandem, a further object of the invention being to provide a construction which may be readily adjusted to satisfy different specific conditions.

In the drawings forming a portion of this specification, and in which like numerals of reference indicate similar parts in both views, Figure 1 is a top plan view showing a construction embodying the present invention. Fig. 2 is a transverse section through a wagon-tongue and showing in elevation the equalizing-lever carried thereby.

Referring now to the drawings, there is shown at 5 the cross-beam or axletree, to which is connected the tongue 6 of a vehicle, said tongue being braced from the axletree by means of the usual irons 7.

A rear equalizing-lever is provided, comprising upper and lower plates 8 and 9, respectively, which are disposed above and below the tongue 6 and are pivotally connected therewith through the medium of the bolt 10, passed through the plates and the tongue, as illustrated. Through the end portions of the plates 8 and 9 are engaged bolts 11 and 12, respectively, which pass through clevises 13 and 14, that are disposed with their ends between said plates and serve to connect the plates and clevises. It will be noted that the pivot-bolt 10 is nearer to the clevis 14 than to the clevis 13.

A tree 15 is disposed transversely above the tongue 6 and is connected with the clevis 13 through the medium of the chain 16 and the clevis 17, which latter is directly connected to the tree by means of the pivot-bolt 18. At the ends of the tree 15 are connected equalizing-levers 19 through the medium of plates 20, which are pivotally bolted to the tree and to the equalizing-levers, the tree having a longitudinal series of perforations 21 at each end to permit of adjustment of the plates 20 to equalize the drafts at the ends of the tree.

At the inner ends of the lever 19 are connected the swingletrees 22 through the medium of plates 23 and bolts 24, while at the outer ends of the equalizing-levers are connected doubletrees 25 through the medium of plates 26, pivoted to the doubletrees and to the equalizing-levers. There is a longitudinal series of perforations 27 in each of the equalizing-levers, so that the plates 26 may be adjusted longitudinally thereof, and at each of the doubletrees 25 is a longitudinal series of perforations 28, which permit of adjustment of the plate 26 longitudinally thereof, the plates being connected to the equalizing-levers and doubletrees by bolts 29 pivotally. Connected with each end of each doubletree 25 is a swingletree 30.

It will be noted that the clevis 13 may be shifted longitudinally of the plates 8 and 9 by reason of the fact that the latter have longitudinal series of perforations 31 therein, which are adapted to interchangeably receive the bolt 11.

Connected to the clevis 14 is a rope or cable 35, which extends forwardly beneath and beyond the tongue 6, and connected to the free end of which is a link 36, which is pivotally connected with an equalizing-lever 37 at a point nearer to one end than to the other. At the near end of the plate 37 is connected a cable 38 through the medium of a link 39. At the opposite end of the lever 37 is a longitudinal series of perforations 40, with which is connected a clevis 41 through the medium of a pivot-bolt 42, passed through one of the perforations, and with the clevis 41 is connected a tree 15', corresponding to the tree 15 and equipped with equalizing-levers 19', doubletrees 25', and swingletrees 22' and 30', corresponding to similar parts connected with the tree 15. The cable 38 is passed beneath and beyond the tree 15', and connected to its forward end is a doubletree 45, having connected with its ends swingletrees 46 in the usual manner.

It will of course be understood that instead of connecting the doubletrees 45 with the cable 38 a tree corresponding to the tree 15' and equipped in like manner may be connected with the cable 38 through the medium of an equalizing-lever corresponding to the lever 37 and having a cable corresponding to the cable 38, to which may be connected the doubletree 45. In other words, any desired number of trees and their equipments may be connected between the rearmost equalizing-lever and the doubletree 45.

In practice modifications of the specific construction shown may be made, and any suitable materials and proportions may be used for the various parts without departing from the spirit of the invention.

What is claimed is—

1. In a draft-equalizer, the combination with a vehicle-tongue, of an equalizing-lever pivotally connected therewith and projecting at opposite sides thereof, a tree connected with the equalizing-lever at one side of the tongue, equalizing-levers connected with the ends of the tree and adjustable longitudinally thereof, a swingletree connected at the inner end of each of the last-named equalizing-levers, a doubletree connected at the outer end of each of the last-named equalizing-levers, and adjustable longitudinally of the latter, swingletrees connected with the doubletrees, a cable connected with the opposite side of the first-named equalizing-lever and extending forwardly therefrom, an equalizing-lever connected to the forward end of the cable, and draft appliances connected with the last-named equalizing-lever, one of said draft appliances being adjustable longitudinally of the equalizing-lever and adapted for hitching of a greater number of draft-animals than the other.

2. In a draft-equalizer, the combination with a vehicle-tongue, of an equalizing-lever pivotally connected therewith and projecting at opposite sides thereof, a tree connected with the equalizing-lever at one side of the tongue, equalizing-levers connected with the ends of the tree and adjustable longitudinally thereof, a swingletree connected at the inner end of each of the last-named equalizing-levers, a doubletree connected at the outer end of each of the last-named equalizing-levers, and adjustable longitudinally of the latter, swingletrees connected with the doubletrees, a cable connected with the opposite side of the first-named equalizing-lever and extending forwardly therefrom, an equalizing-lever connected to the forward end of the cable, a second cable connected to one end of the last-named equalizing-lever, draft appliances connected to the forward end of the second cable, a tree connected with the opposite end of the last-named equalizing-lever and adjustable longitudinally of the latter and draft appliances carried by the tree.

In testimony whereof I affix my signature in presence of two witnesses.

ISAAC N. NOYER.

Witnesses:
ATTWOOD KIRBY,
W. A. HARRISON.